(12) United States Patent
Bonomo et al.

(10) Patent No.: US 9,053,452 B2
(45) Date of Patent: Jun. 9, 2015

(54) SUPPLY ORDERING SYSTEM AND METHOD

(71) Applicant: MSC SERVICES CORP., Melville, NY (US)

(72) Inventors: Charles Bonomo, West Islip, NY (US); Alan P. Yang, Head of the Harbor, NY (US); Joseph Patrick Lo Faso, Holtsville, NY (US); Brian Todd Reardon, Rockville Centre, NY (US); David W. Hopkins, Coram, NY (US)

(73) Assignee: MSC Services Corp., Melville, NY (US)

( * ) Notice: Subject to any disclaimer, the term of this patent is extended or adjusted under 35 U.S.C. 154(b) by 0 days.

(21) Appl. No.: 13/939,854

(22) Filed: Jul. 11, 2013

(65) Prior Publication Data

US 2013/0292465 A1    Nov. 7, 2013

Related U.S. Application Data

(63) Continuation of application No. 13/446,174, filed on Apr. 13, 2012, now abandoned.

(51) Int. Cl.
*G06F 17/00* (2006.01)
*G06Q 10/08* (2012.01)

(52) U.S. Cl.
CPC .................................. *G06Q 10/087* (2013.01)

(58) Field of Classification Search
CPC .................................................. B65H 2511/40
USPC ......................................................... 235/375
See application file for complete search history.

(56) References Cited

U.S. PATENT DOCUMENTS

| | | | |
|---|---|---|---|
| 7,823,778 B1 | 11/2010 | Singh | |
| 2001/0037259 A1 | 11/2001 | Sharma | |
| 2002/0010659 A1 | 1/2002 | Cruse | |
| 2002/0199047 A1* | 12/2002 | DuPont et al. | 710/100 |
| 2005/0015311 A1* | 1/2005 | Frantz et al. | 705/26 |
| 2007/0290045 A1* | 12/2007 | Cisar | 235/462.46 |
| 2008/0168164 A1 | 7/2008 | Arseneau | |
| 2008/0217392 A1* | 9/2008 | Weiner et al. | 235/375 |
| 2010/0138280 A1* | 6/2010 | Fowler | 705/10 |
| 2011/0302051 A1* | 12/2011 | Arbatli | 705/26.8 |
| 2012/0181338 A1* | 7/2012 | Gao | 235/455 |

OTHER PUBLICATIONS

Jeff Dobyns, Customer Managed Inventory, Journal, Jun. 3, 2009, pp. 3-7, Johnstone Supply-Data Services LLC, Portland, Oregon.

* cited by examiner

*Primary Examiner* — Thien M Le
*Assistant Examiner* — Tae Kim
(74) *Attorney, Agent, or Firm* — Curtis, Mallet-Prevost, Colt & Mosle, LLP

(57) ABSTRACT

A system and method for ordering supplies, includes a portable barcode scanner configured to output data according to at least one of an HID, CDC or SPP protocol. A mobile phone device incapable of recognizing and parsing data when the data is configured according to the HID, CDC or SPP protocol is connected to the scanner using a communication connection. A scanner adapter application on the mobile phone device, which receives the output data comprising order data, is configured to parse the order data and pass it to an upload application having a current data field that receives at least part of the order data. A listener server configured to receive the at least part of the order data from the upload application processes the order information into an electronic order, and sends the electronic order to a vendor server.

23 Claims, 10 Drawing Sheets

SUPPLY ORDERING SYSTEM AND METHOD

CROSS-REFERENCE TO RELATED PATENT APPLICATIONS

This application is a continuation of U.S. application Ser. No. 13/446,174 filed on Apr. 13, 2012.

BACKGROUND

1. Field

This disclosure relates generally to resource requirements planning, and more particularly, to a system and method for maintaining stocks of necessary supplies.

2. Background

Many businesses maintain regular stocks of consumable supplies. For example, businesses involved in mechanical manufacturing and repair may require consumable stocks of mechanical fasteners, tools and other implements, such as screws, nuts, drill bits, sockets and other related items. These supplies may be stocked in supply bins, and must be reordered periodically as the supplies are utilized in the normal course of business. Monitoring the stock of supplies is often tedious, especially for large and/or diverse stocks of supplies. For example, a supply officer would need to peruse the entire stock collection, identify which stocks are running low, record the information, contact multiple vendors, cross reference to obtain the best price on each stock item, and then place one or more orders to ensure the business is obtaining the best price overall during restocking. This process may become very inefficient when a supply officer is tasked with maintaining a stock of hundreds of diverse supply items, each sold by a dozen or more vendors.

Creating a computer-aided process that utilizes a barcode scanner for supply cataloguing and ordering would therefore be highly advantageous. However, this solution may be frustrated by the fact that customers may be reluctant to allow installation of third party software suites on their computer systems, which are often the sole reliable access to the Internet able on-site at a customer location. Therefore, while vendor agents or authorized users of vendor-issued inventory cataloguing systems may be allowed to visit the customer's facility to assess the customer's current stock of supplies, they have no reliable data connection with which to upload the information to the vendor.

BRIEF SUMMARY

In one aspect of this disclosure, a system for ordering of supplies is disclosed. The system includes a portable barcode scanner configured to output data according to at least one of an HID, CDC or SPP protocol, the output data reflecting results of scanning a barcode. The system also includes a mobile phone device, physically removed from the portable barcode scanner, having an input port through which an external device can provide data to the mobile phone for processing. The mobile phone device is incapable of recognizing and parsing data, received via the input port, when the data is configured according to the HID, CDC or SPP protocol. The system further includes a communication connection connecting the mobile phone device and the portable barcode scanner to each other via the input port. A scanner adapter application, operating on the mobile phone device, receives the output data from the portable barcode scanner via the input port, the output data comprising order data relating to a supply item stocked in a bin and configured according to one of the HID, CDC or SPP protocols. The scanner adapter application is configured to parse the order data and pass the order data to an upload application operating on the mobile phone device, the upload application having a current data field that receives at least part of the order data. The system additionally includes a listener server configured to receive order information including the at least part of the order data, from the upload application on the mobile phone device, process the received order information into an electronic order, and send the electronic order to a vendor server. The system further includes an interface through which the mobile phone device can connect to the listener server via a network.

In another aspect of this disclosure, a system for ordering of supplies is disclosed. The system includes a portable barcode scanner configured to output data, the output data reflecting results of scanning a barcode. A mobile phone device, physically removed from the portable barcode scanner, includes an input port through which an external device can provide data to the mobile phone for processing, the mobile phone device being incapable of recognizing and parsing data received via the input port. A communication connection connects the mobile phone device and the portable barcode scanner to each other via the input port. A scanner adapter application, operating on the mobile phone device, receives the output data from the portable barcode scanner via the input port, the output data comprising order data relating to a supply item stocked in a bin. The scanner adapter application is configured to parse the order data and pass the order data to an upload application operating on the mobile phone device. The upload application includes a current data field that receives at least part of the order data. The upload application being further configured to upload order information to a listener server, via a network, the order information including the at least part of the order data via an interface of the mobile phone device.

In another aspect of this disclosure, a computer-implemented method for ordering of supplies is disclosed. The method includes scanning, using a portable scanner, at least one item barcode on a bin, the item barcode being associated with a supply item stocked within the bin. Order information data is transmitted from the portable scanner to a mobile phone device remotely located from the scanner, the order information data being configured red according to an HID, CDC or SPP protocol and corresponding to the item barcode. The order information is received from the portable scanner in an adapter application operating on the mobile phone device. The adapter application parses the order information data and transfers the order information data into a data field of an upload application operating on the mobile phone device. The order information data is transmitted using the upload application to a listener server. The received order information is processed, using the listener server, into an electronic order, which is transmitted to a vendor server.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This application discloses a supply ordering system and method. The disclosed supply ordering system and method greatly streamlines the process of maintaining supply stocks using a combination of electronic barcode labeling, barcode scanners and computer control.

Figure 1:
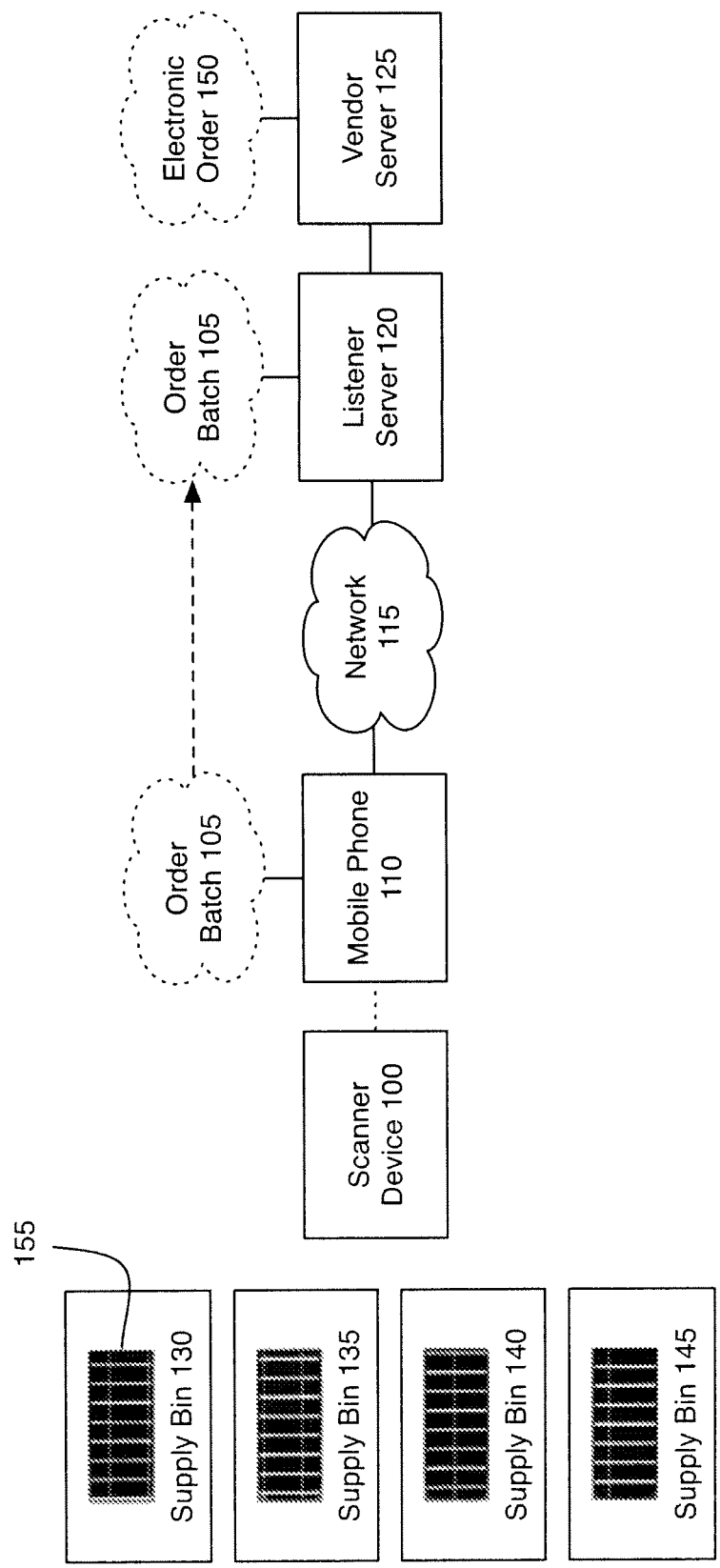
FIG. 1 is a high level representation of the operation of a supply ordering system as described herein.

FIG. 1 is a high level overview of an exemplary supply ordering system. Each supply bin 130-145 may be labeled with a barcode 155, which contains information preferably identifying at least the supply stocked in the bin, the re-order quantity for the supply item and the minimum/maximum inventory level for the item. A portable barcode scanner device 100, which may be configured to output information according to the Human Interface Device ("HID"), communication Device Class ("CDC") protocol or Serial Port Profile ("SPP") is operatively connected to a mobile phone device 110 by direct physical connection, such as a universal serial bus ("USB") connection or using some other method of wirelessly transferring data according to, for example, short-range wireless communication standard protocol (such as a Bluetooth®) between the mobile phone device 110 and the portable scanner device 100. The scanner device 100 is used to scan the barcodes 155 to reorder that item. An order batch 105 is prepared on the mobile phone device 110.

When supplies are needed, a user scans the relevant barcodes 155 for the desired supply items with the portable scanner device 100, adding the scanned supply items to the order batch 105. One or more software applications are installed on the mobile phone device 110 to (i) receive the HID, CDC or SPP information from the scanner 100 and parse it into a format usable by one or more relevant applications on the mobile phone 110 to thereby facilitate communication between the two devices, and (ii) to coordinate external transmission of the order batch information 105.

Mobile phone device 110 may take the form of, for example, a personal data assistant ("PDA") with internet connectivity, a smart phone, such as an iPhone® or Blackberry®, or similar devices. In addition to mobile phone devices, tablet devices, such as Android® platform tablets or the iPad® may be utilized. Once a connection has been established, an upload software application 220 installed on the mobile phone device 110 coordinates the upload of information from the mobile phone device 100 to a listener server 120. For example, the software program may be installed on the smart phone as a smart phone "app." Subsequently, the mobile phone device 110 transmits the order batch 105 through network 115 to the listener server 120. Finally, the listener server 120 converts the order batch 105 into an electronic order 150 and forwards the electronic order 150 to the primary vendor server 125. For example, the listener server 120 may open an electronic "shopping cart" on the vendor's website, and stock it with the desired supply items as indicated from the order batch 105.

Figure 2:
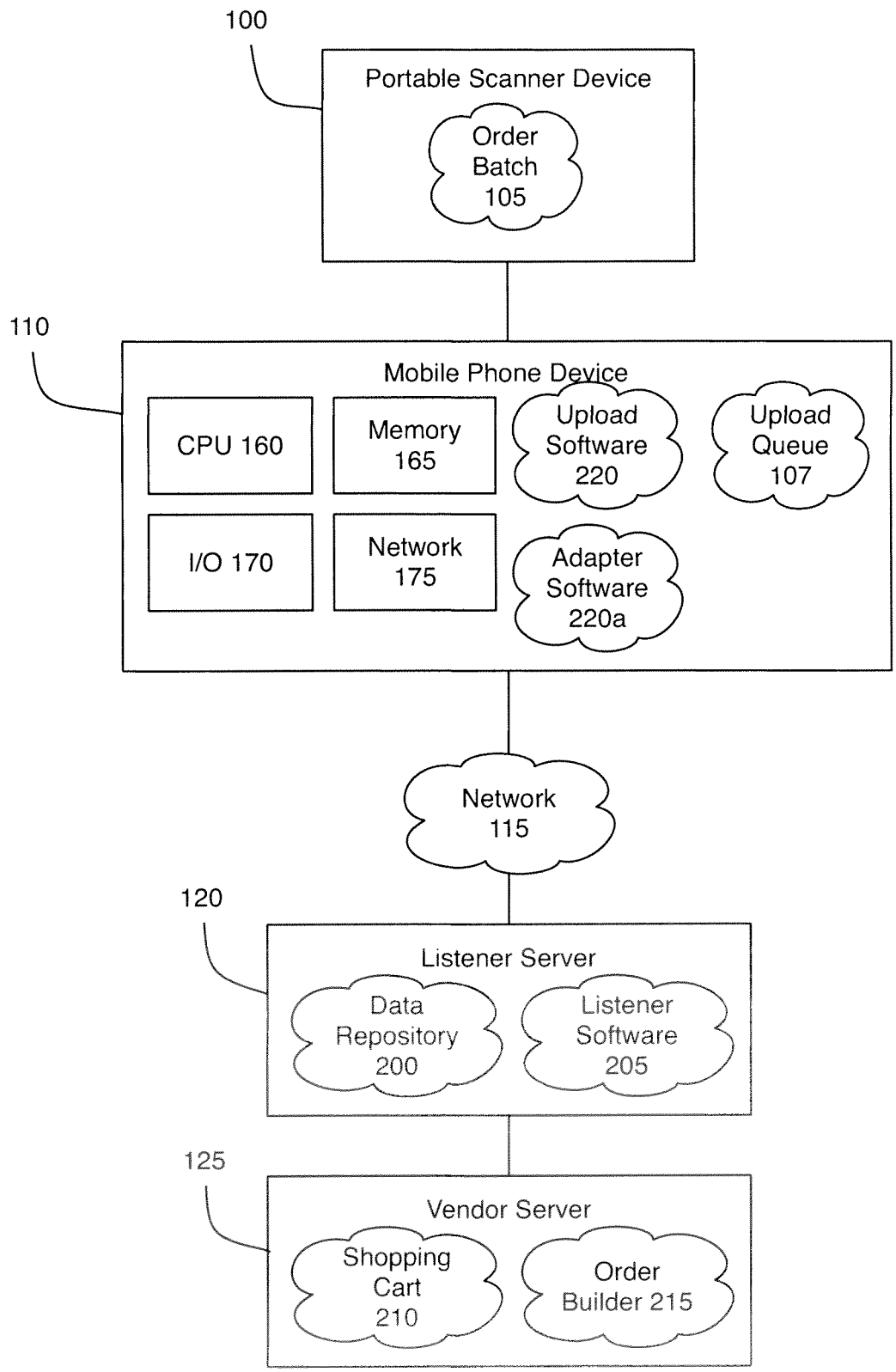
FIG. 2 is a high-level representation of the supply ordering system as described herein.

FIG. 2 is a high-level representation of the supply ordering system. The portable scanner device 100 may be implemented using a commercially available scanning device configured to output information according to the Human Interface Device ("HID"), communication Device Class ("CDC") or Serial Port Profile ("SPP") protocol, such as a stand-alone barcode scanner, a barcode scanner attachment for an existing device or an application that allows another device to scan barcodes. For example, a barcode scanner that is communicatively coupled (either physically or wirelessly) to a cell phone may be used to implement the portable scanner device 100. Alternatively, an application that allows a smart phone to scan barcodes using a built-in camera may be used as well. The portable scanner device 100 is preferably low cost, capable of reading common barcodes, compact, and shock-resistant. The portable scanner device 100 may communicate with the mobile phone device 110 via an input port, which may take the form of a wireless connection, such as Bluetooth®, or a detachable connection, such as a universal serial bus ("USB") cable, or direct physical coupling with the mobile phone device 110. Sufficient memory may be provided to the mobile phone device 110 to store a large number of batches and scanned barcodes, in accordance with the needs of the user. Data encryption may also be desirable if some measure of data security is desired. As described above, order batches 105 may be stored within the mobile phone device 110. Each order batch 105 is a data structure containing scanned barcodes (desired supply items for purchase) for a single self-contained purchasing order.

The supply ordering system may be implemented with one or more mobile phone devices 110 of varying configurations. In some cases, the mobile phone device 110 may be of a type that is incapable of processing, recognizing or parsing data received from a device that is configured according to the Human Interface Device ("HID") communication Device Class ("CDC") protocol or Serial Port Profile ("SPP"). As depicted in FIG. 2 and discussed above, mobile phone device 110 may be a smart phone, such as an iPhone® or Blackberry®. Each mobile phone device 110 preferably includes computing components for executing computer program instructions and processes. These components may include a processor or central processing unit (CPU) 160, memory 165, input/output (I/O) devices 170, and a network interface 175. The CPU 160 processes and executes computer program instructions. Random access memory (RAM) 165 and/or fast access cache memory preferably provides fast data supply to CPU 160. Long-term storage may be provided as a more permanent form of computer memory, and may be, for example, a hard disk, optical disk, flash memory, solid-state memory, tape, or any other type of memory. The I/O device(s) 170 permit human interaction with the computer system, such as (but not limited to) a mouse, keyboard and computer display. I/O device(s) may also include other interactive devices, such as (but not limited to) touch screens, digital stylus, voice input/output, etc. The network interface device 175 may provide the mobile phone device 110 with access to a network, which may be a cellular, wireless ("wifi") or wired connection. The network 115 may be, for example, the Internet, a cellular network, a corporate intranet, or any other computer network through which the computing system may connect to or otherwise communicate with other computers and databases.

Software process or processes and executables may be used to provide human interfaces (such as a graphical user interface) and to store and initiate computer program instructions used to process and analyze data. Computer program code for carrying out operations described herein may be written in any combination of one or more programming languages, including an object oriented programming language such as Java, C++, C# or the like and conventional procedural programming languages, such as the "C" programming language or similar programming languages. The program code may execute entirely on the computing system, partly on the computing system, as a stand-alone software package, partly on the computing system and partly on a remote computer or server, or entirely on a remote computer or server.

The upload software 220 may be loaded on the mobile phone device 110 as, for example, a mobile phone application (such as an "app") and coordinate the upload of order batches 105 (either independently or in conjunction with listener software 205 on a listener server 120) to the vendor server 125 from this central location. An adapter software application 220a may be provided on the mobile phone device 110 to enable or facilitate communication between the portable scanner device 100 and the mobile phone device 110. The adapter software application 220a may be a component of the upload software 220, or a separate software entity. Certain combinations of mobile phone devices 110 and portable scanner devices 100 may be incompatible with one another. For example, the Motorola® CS3070 scanner outputting in HID batch mode or single item mode is incompatible with most Motorola® Blackberry® smart phones, because the CS3070 output appears to a recipient device to be keyboard data, and the Blackberry® cannot pair with a keyboard in this manner. The adapter application software 220a running on the mobile phone device 110 allows the pairing of the incompatible Blackberry® and CS3070 scanner operating in HID batch mode or single item mode.

One or more listener servers 120 may be configured to receive the order batch 105 uploaded by the upload application software 220 running on the mobile phone device 110. Upon receiving a prompting from a mobile phone device 110 (through network 115), listener software 205 operating on the listener server 120 receives the order batch 105 from the mobile phone device 110 via network 115 and stores the received order batch 105 in the data repository 200 associated with the listener server 120.

The listener server 120 preferably processes the order batch 105, generates an electronic order 150, and forwards the electronic order to at least one vendor server 125. The vendor server 125 may be, for example, a server hosting a vendor's retail website, and would therefore list the vendor's available stock, prices and have the capacity to create and maintain electronic "shopping carts" 210 for easing the online retail process. Order builder software 215 is also provided to retrieve the order batch 105 information from the data repository 200, and populate the shopping cart 210 with the supply items stored in the order batch 105.

Figure 3:
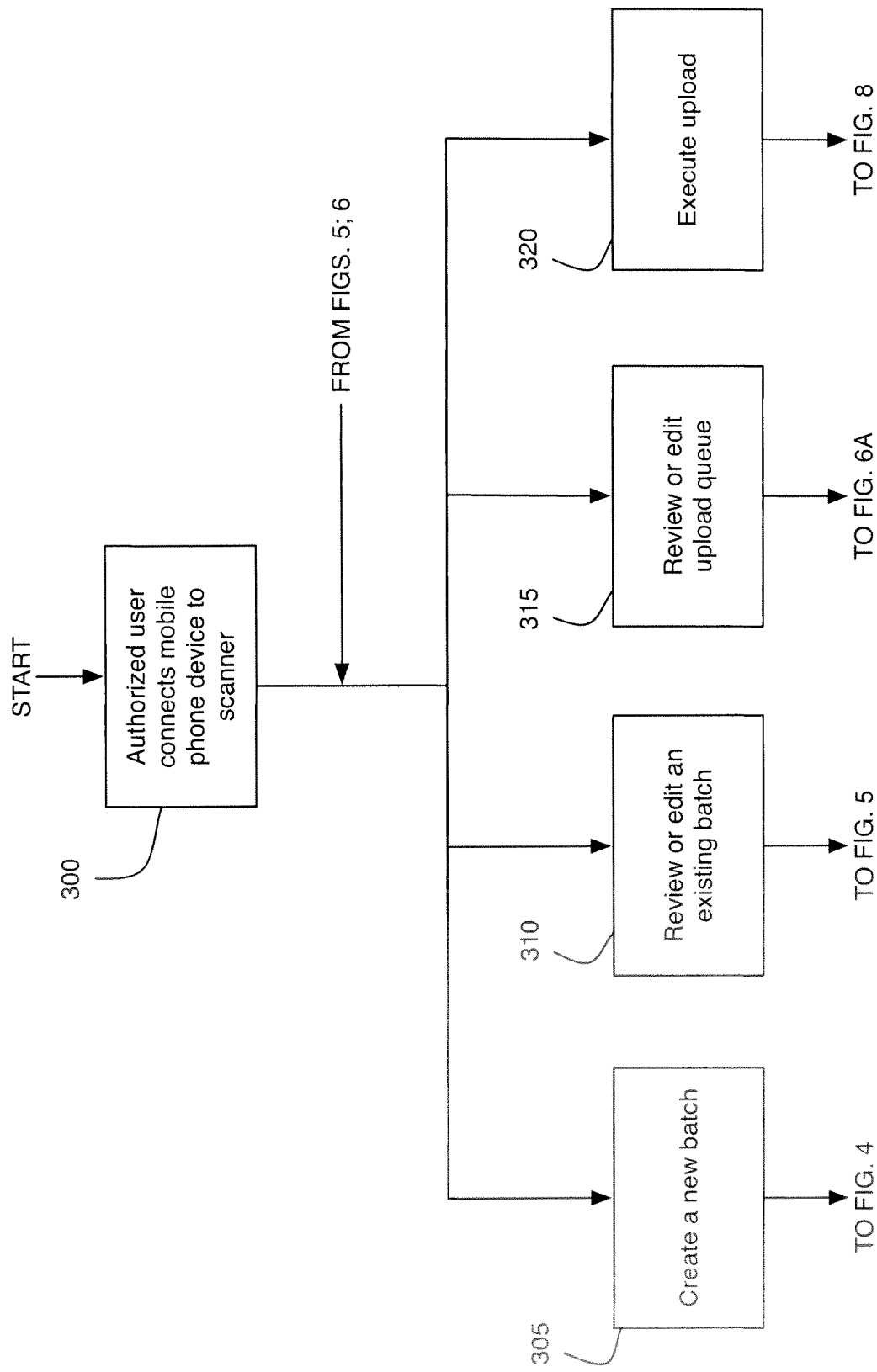
FIG. 3 is an example sequence of steps for implementing the supply ordering system.

FIG. 3 is an example sequence of steps for implementing the supply ordering system. An authorized user may couple the mobile phone device 110 to the portable scanner 100 (step 300). From there, the upload software or app 220 installed on the mobile phone device 110 may present the user with at least four options. The user may create a new order batch (step 305), edit an existing batch (step 310), review or edit the upload queue (step 315) or execute an order batch upload (step 320).

Figure 4:
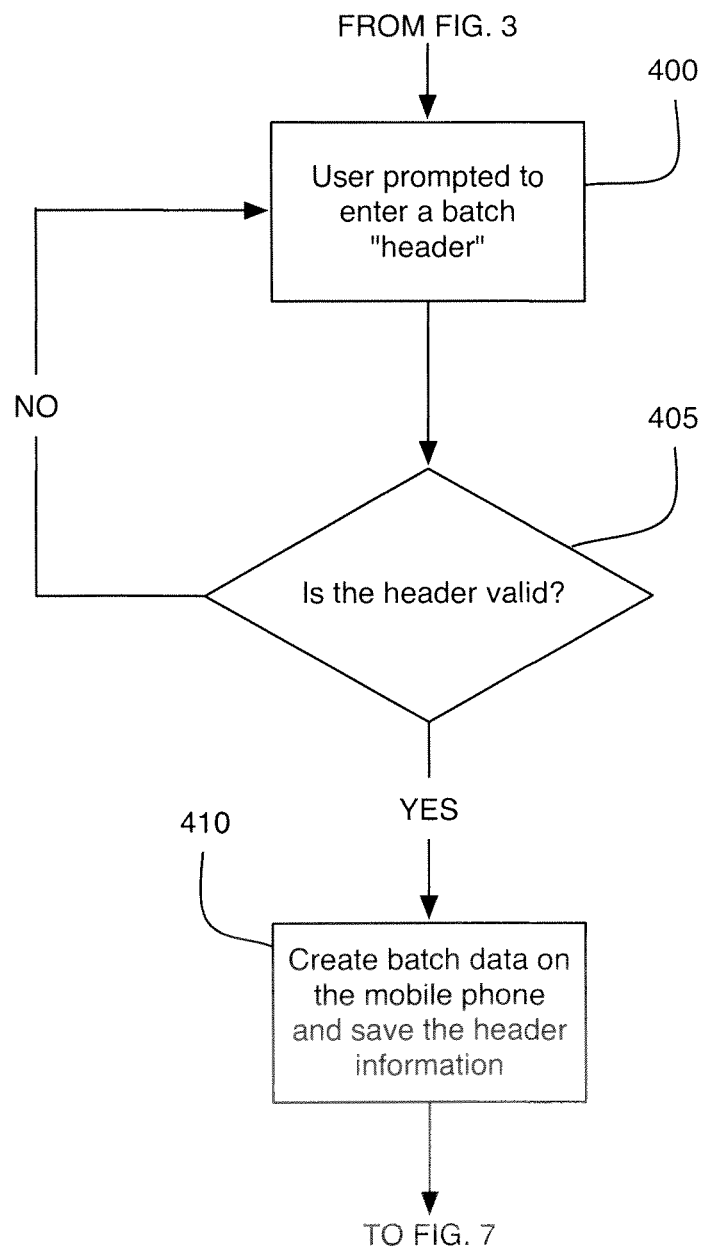
FIG. 4 is a continuing sequence of steps for implementing the supply ordering system.

FIG. 4 is a continuing sequence of steps for implementing the supply ordering system, when the user selects to create a new order batch (step 305). The user is prompted to enter a batch "header," or a general label that will uniquely identify the current batch (step 400). Once entered, the mobile phone device 110 validates the header to determine whether it has already been used (step 405). If the header is not valid, the user is prompted to enter another header (step 400). If the header is valid, the batch is created on the mobile phone device 110 and saved, using the header as an identifier (step 410). The process then continues to the steps of FIG. 7.

Figure 5:
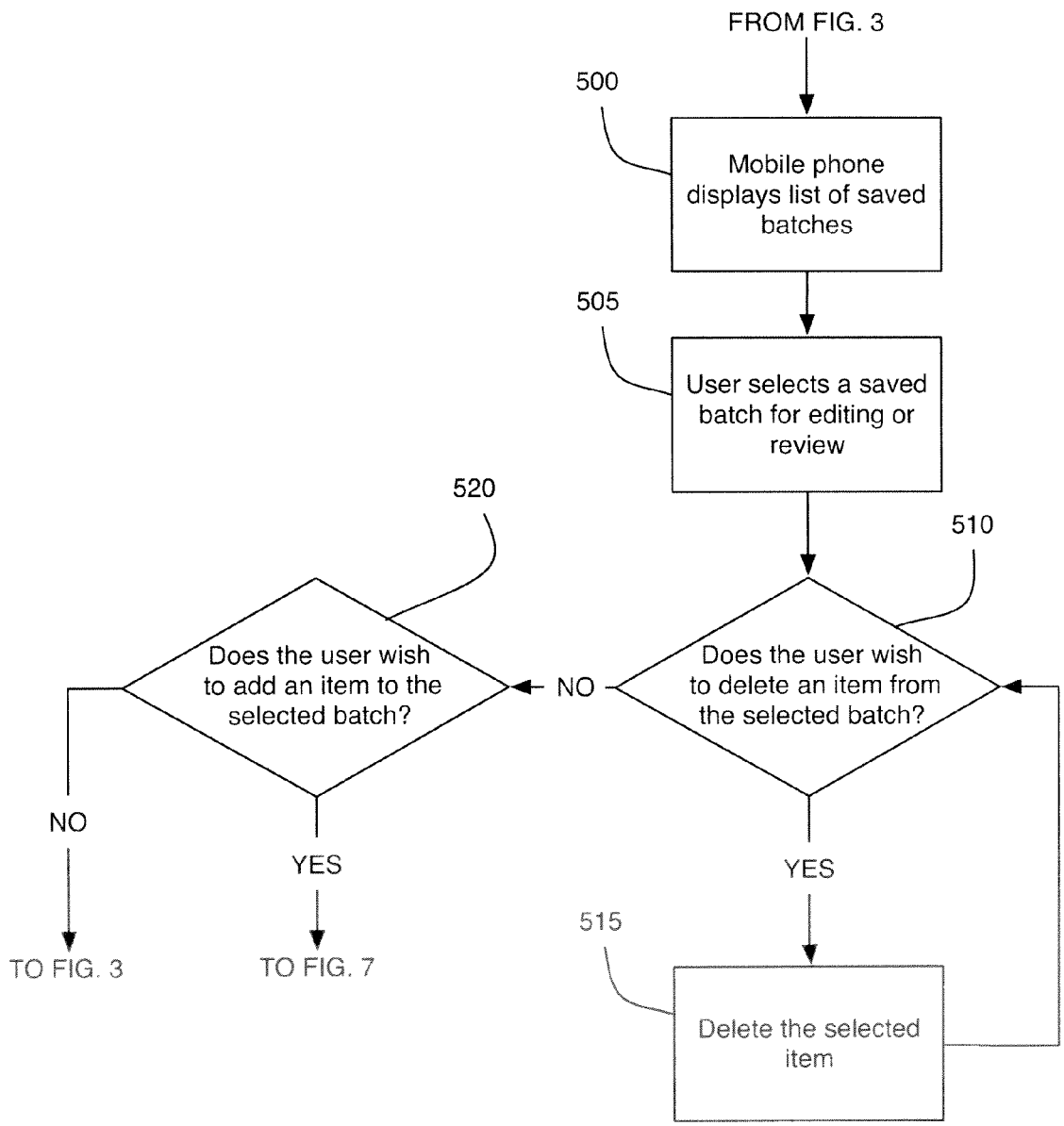
FIG. 5 is a continuing sequence of steps for implementing the supply ordering system.

FIG. 5 is a continuing sequence of steps for implementing the supply ordering system, when the user selects review or editing of an existing order batch (step 315). The mobile phone device 110 displays to the user a list of saved batches (step 500). The user may then select a saved batch for review or editing (step 505). If the user desires to delete an item from a selected batch (step 510), the mobile phone device 110 may await receipt of a selection of an item for deletion. Upon receiving the selection, the mobile phone device 110 deletes the selected item (step 515). Similarly, if the user desires to add an item to the current batch (step 520), the process proceeds to the steps of FIG. 7. Otherwise, the process returns to the steps of FIG. 3.

Figure 6A:
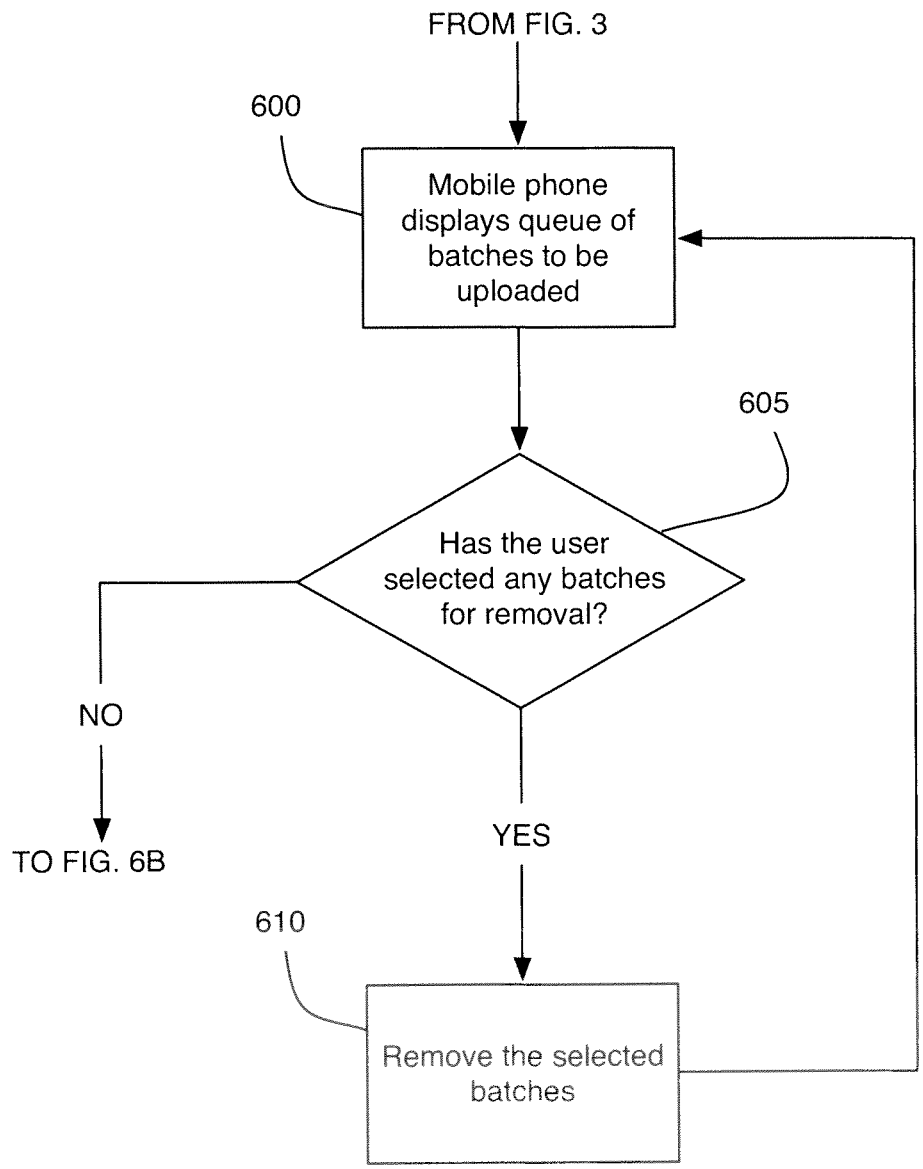
FIG. 6A is a continuing sequence of steps for implementing the supply ordering system.

FIG. 6A is a continuing sequence of steps for implementing the supply ordering system, illustrating the process when the user selects to review or edit the upload queue (step 315). The mobile phone device 110 may display to the user a list of batches on the upload queue for selection (step 600). The user may be presented with the option to select a batch for removal (step 605). If the user selects one or more batches for removal (step 605), the selected batches are removed (step 610). If the user does not select a batch for removal, the process proceeds to the steps of FIG. 6B.

Figure 6B:
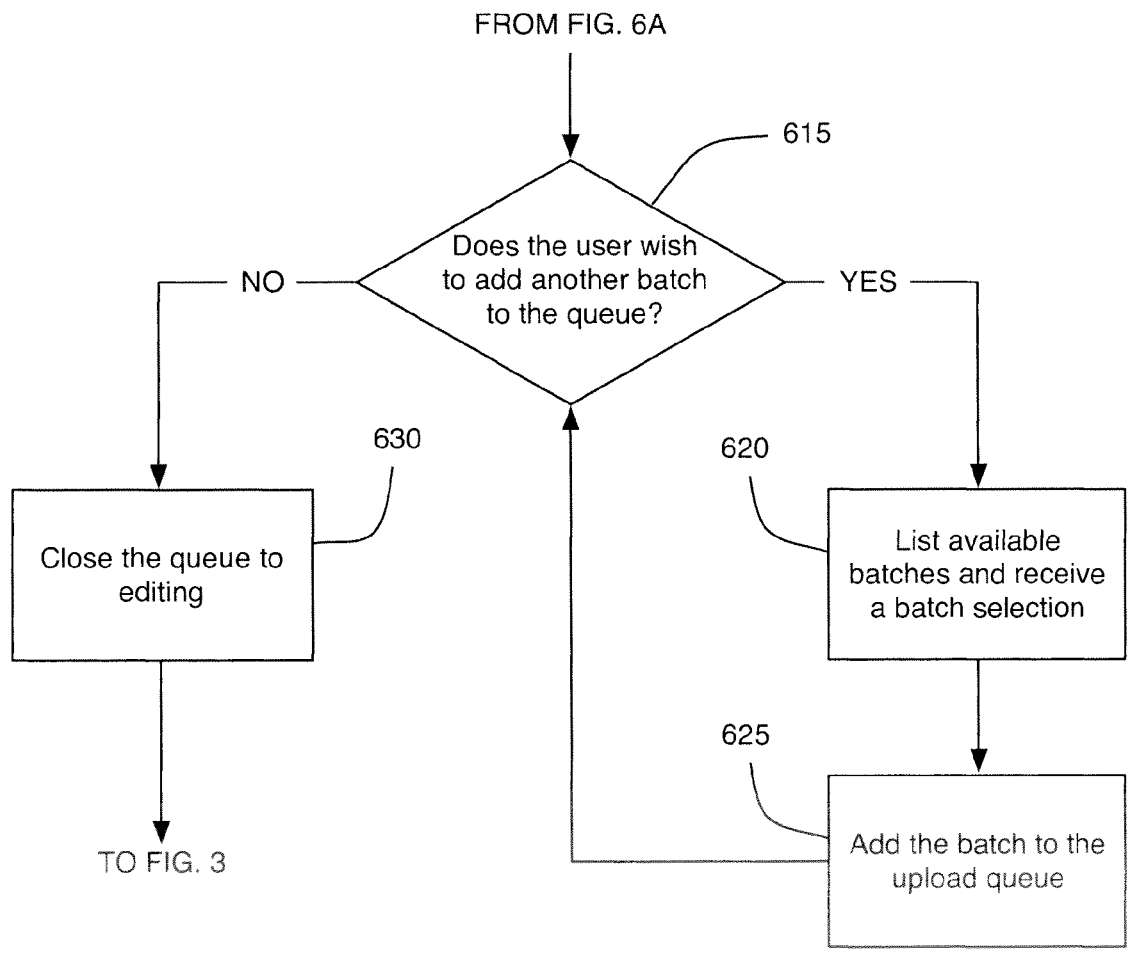
FIG. 6B is a continuing sequence of steps for implementing the supply ordering system.

FIG. 6B is a continuing sequence of steps for implementing the supply ordering system. The mobile phone device 110 may allow a user to add batches to the queue as well. If a user selects to add a batch to the queue (step 615), the mobile phone device 110 may display a list of available batches and receive a selection of one or more batches for addition to the queue (step 620). The selected batches are then added to the queue (step 625). If no selection is received (step 615), then the queue is closed to editing (step 630), and the process returns to the steps of FIG. 3.

Figure 7:
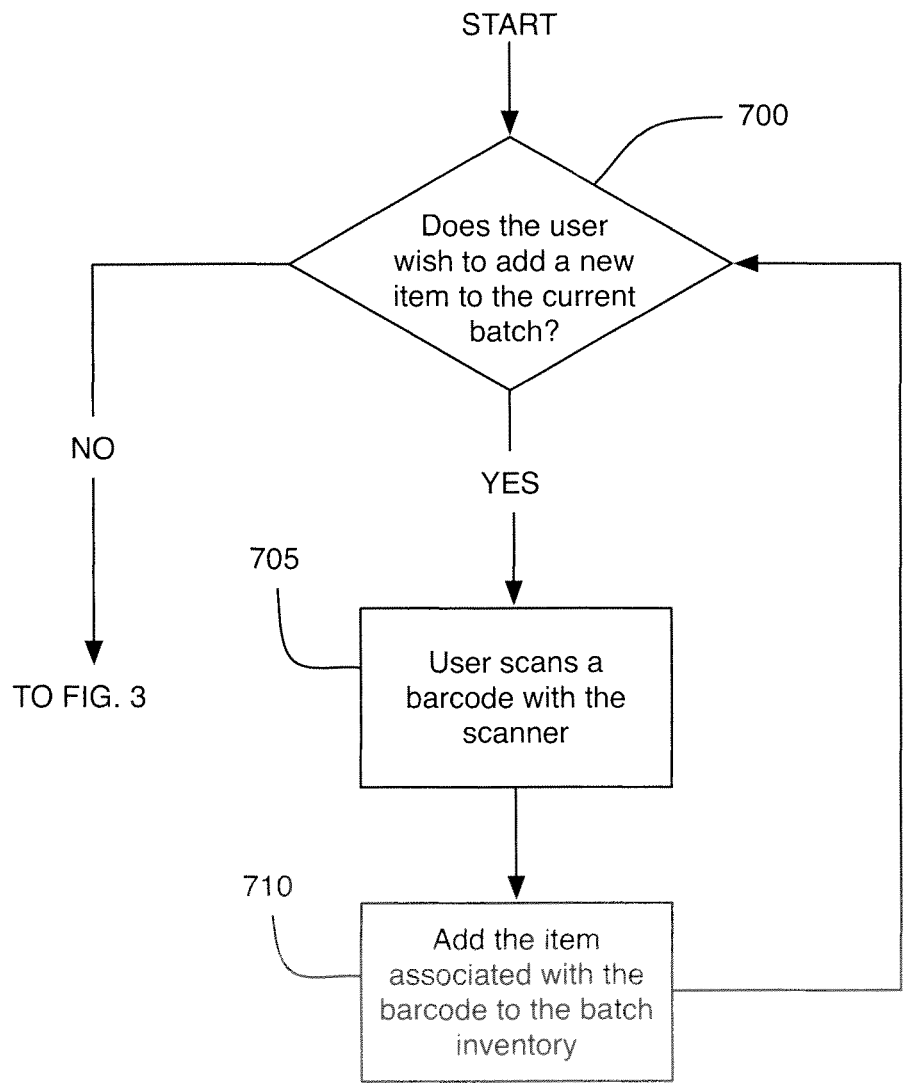
FIG. 7 is a continuing sequence of steps for implementing the supply ordering system.

FIG. 7 is a continuing sequence of steps for implementing the supply ordering system, describing the sequence of steps for adding new items to an existing batch. When a user has a batch open for editing and desires to add an item to the current batch (step 700), the user may scan a barcode on a supply bin housing a desired supply item (step 705). The scanned item is then added to the current batch inventory (step 710). Once all desired items have been scanned, and no more items are to be added to the batch (step 700), the process returns to the steps of FIG. 3.

Figure 8:
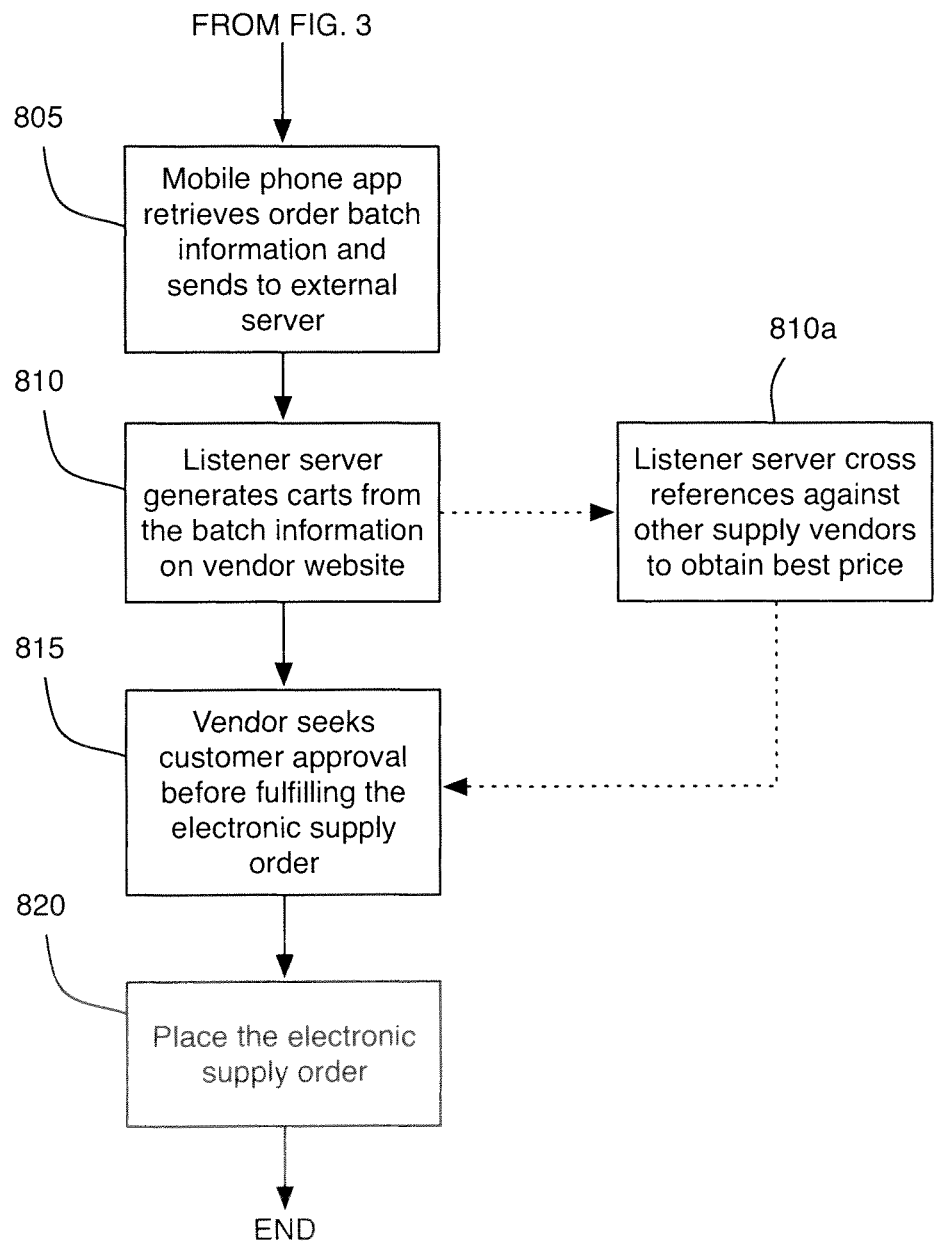
FIG. 8 is a continuing sequence of steps for implementing the supply ordering system.

FIG. 8 is a continuing sequence of steps for implementing the supply ordering system, illustrating the process by which a user adds batches to the upload queue. Uploads may be commenced upon receiving an indicator that the user wishes to initiate uploads to a listener server 120. Alternatively, they may be performed periodically and automatically by the upload software application 220. The upload software application 220 running on the mobile phone device 110 may retrieve order information from the upload queue and send the information to the required external server (step 805), such as the listener server 120 (as described above).

Subsequently, order generator software on the listener server 120 may automatically create an electronic supply order 150 for one or more batches on the vendor server 125 (step 810). For example, the order generator on the listener server 120 may create a "shopping cart" 210 on the primary vendor website and populate it with the items desired in the relevant order batch. Alternatively, the order generator may create an electronic order 150 in other formats, such as fax transmittal or e-mail. If desired, the listener server order generator software may access competing vendor websites and cross references prices for similar items and provide the comparison for the customer's benefit (step 810a). Finally, the vendor may seek customer approval before contracting to fulfill the electronic supply order 150 (step 815). Once approved, the electronic supply order 150 may be placed (step 820). Alternatively, information may be sent directly to the primary vendor server 125 (bypassing the use of a listener server 120), and the order may be generated directly.

Figure 9:
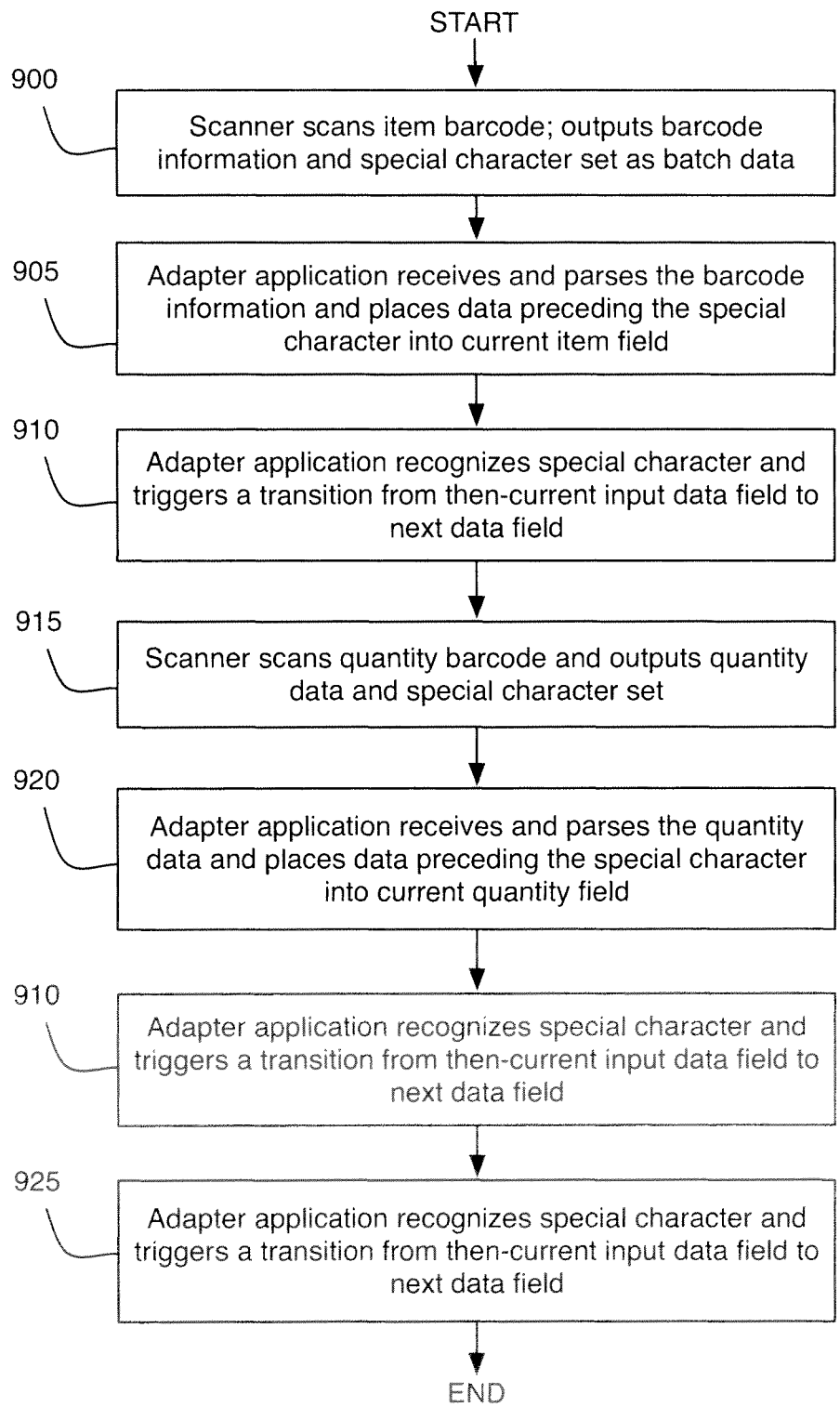
FIG. 9 is an example sequence of steps for implementing adapter software for one embodiment of the supply ordering system.

FIG. 9 is an example sequence of steps for implementing the adapter software application 220a for one embodiment of the supply ordering system. As described above, the adapter application 220a may be loaded on mobile phone device 110 to enable or facilitate communication between the portable scanner device 100 and the mobile phone device 110 in instances where communication between the mobile phone device 110 and the portable scanner device 100 is hindered, such as when the mobile phone device 110 is incapable of recognizing and parsing data configured according to HID, CDC or SPP protocol received via an input port from the portable scanner device 100.

In one embodiment, each item barcode 155 may have a special character appended to the end of the barcode. The special character is used to delineate the end of a piece of information and can be used to automatically trigger a change from one data input field in the upload application 220 to another. A special quantity barcode sheet containing quantity barcodes may also be provided to allow a user to scan in desired quantity information using the portable scanner device 100. This may enable quick and easy input of quantity using the portable scanner device 100. The quantity barcodes may also similarly utilize a special character to auto automatically trigger a change from one field to another.

When the portable scanner device 100 scans an item barcode, the barcode information (including the special character) may be output by the scanner as batch data configured according to either an HID, CDC or SPP protocol and transmitted to the mobile phone device 110 (step 900). The adapter application 220a operating on the mobile phone device 110 receives the data, parses it, and causes the data preceding the special character to be inserted into a current data field corresponding to an item identifier within the upload application 220 (step 905). The adapter application 220a, upon encountering a special character, triggers a transition from the then-current input data field to the next data field in the upload application 220, which may correspond to, for example, a field for additional item information or an item quantity (step 910).

Subsequently, in the case of a transition to a quantity field, the portable scanner device 100 may be used to scan a quantity barcode, outputting data reflecting the quantity and a special character (step 915). As before, the adapter application 220a receives and parses the quantity data (excepting special characters) and places it into the then-current field in the upload application 220, which is the quantity field (due to step 910) (step 920). Again, when the adapter application 220a identifies a special character following the quantity barcode data, an automatic transition to the next data field within the upload application 220 is triggered, which may correspond with a new item data field (step 925). This process may be repeated as necessary for items until all items have been desired to be entered have been entered into the order batch.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

The invention claimed is:

1. A system for ordering of supplies, comprising:
a portable barcode scanner configured to output data according to at least one of an HID, CDC or SPP protocol, the output data reflecting results of scanning a barcode;
a mobile phone device, physically removed from the portable barcode scanner, having an input port through which an external device can provide data to the mobile phone for processing, the mobile phone device being incapable of recognizing and parsing data, received via the input port, when the data is configured according to the HID, CDC or SPP protocol;
a communication connection connecting the mobile phone device and the portable barcode scanner to each other via the input port;
a scanner adapter application, operating on the mobile phone device, which receives the output data from the portable barcode scanner via the input port, the output data comprising order data relating to a supply item stocked in a bin and configured according to one of the HID, CDC or SPP protocols, the scanner adapter application being configured to parse the order data and pass the order data to an upload application operating on the mobile phone device, the upload application having a current data field that receives at least part of the order data;
a listener server configured to receive order information including the at least part of the order data, from the upload application on the mobile phone device, receive and compile the order information as at least one order batch whereas each order batch is a data structure containing scanned barcodes, convert the at least one order batch into an electronic supply order, store the at least one order batch in a data repository associated with the listener server, and send the electronic supply order to a vendor server;
the listener server further being configured to automatically create an electronic supply order for one or more batches containing scanned barcodes on the vendor server; and
an interface through which the mobile phone device can connect to the listener server via a network.

2. The system of claim 1, wherein the output data comprises a special character that causes the scanner adapter application to move from the current data field to a next data field when the special character is received.

3. The system of claim 2, wherein the output data further comprises information obtained by scanning a quantity barcode, the quantity barcode corresponding to a desired order quantity for the supply item.

4. The system of claim 1, wherein the scanner adapter application operating on the mobile phone device is configured to receive an output from the portable scanner representing quantity information and parse it for entry into a quantity data field of the upload application.

5. The system of claim 1, wherein the communication connection is a wired communication connection.

6. The system of claim 1, wherein the vendor server hosts a website for a supply vendor, and the electronic order is processed into a shopping cart on the website populated with at least one supply product corresponding to the supply item.

7. The system of claim 1, wherein the listener server is further configured to cross reference pricing information on the vendor server against pricing information on competitor vendor servers to determine a best price for the electronic order.

8. The system of claim 1, wherein the portable barcode scanner is configured to output data in batch mode or single item mode.

9. A system for ordering of supplies, comprising:
a portable barcode scanner configured to output data, the output data reflecting results of scanning a barcode;
a mobile phone device, physically removed from the portable barcode scanner, and having an input port through which an external device can provide data to the mobile phone for processing, the mobile phone device being incapable of recognizing and parsing data, received via the input port;
a communication connection connecting the mobile phone device and the portable barcode scanner to each other via the input port; and
a scanner adapter application, operating on the mobile phone device, which receives the output data from the portable barcode scanner via the input port, the output data comprising order data relating to a supply item stocked in a bin, the scanner adapter application being configured to parse the order data and pass the order data to an upload application operating on the mobile phone device, the upload application having a current data field that receives at least part of the order data, the upload application being further configured to upload order information to a listener server, via a network, the order information including the at least part of the order data via an interface of the mobile phone device;
whereas the listener server is configured to automatically create an electronic supply order for one or more batches containing scanned barcodes on the vendor server; and
whereas the listener server is further configured to receive order information including the at least part of the order data, from the upload application on the mobile phone device, receive and compile the order information as at least one order batch whereas each order batch is a data structure containing scanned barcodes, convert the at least one order batch into an electronic supply order, store the at least one order batch in a data repository associated with the listener server, and send the electronic supply order to a vendor server.

10. The system of claim 9, wherein the scanner adapter application operating on the mobile phone device is configured to receive an output from the portable scanner representing quantity information and parse it for entry into a quantity data field of the upload application.

11. The system of claim 10, wherein the output data further comprises information obtained by scanning a quantity barcode, the quantity barcode corresponding to a desired order quantity for the supply item.

12. The system of claim 10, further comprising a listener server configured to receive order information including the at least part of the order data, from the upload application, process the received order information into an electronic order, and send the electronic order to a vendor server.

13. The system of claim 9, wherein the output data is configured according to the HID, CDC or SPP protocol.

14. The system of claim 10, wherein the output data comprises a special character that causes the scanner adapter application to move from the current data field to a next data field when the special character is received.

15. The system of claim 9, wherein the portable barcode scanner is configured to output data in batch mode or single item mode.

16. A computer-implemented method for ordering of supplies, comprising:

scanning, using a portable scanner, at least one item barcode on a bin, the item barcode being associated with a supply item stocked within the bin;

transmitting order information data from the portable scanner to a mobile phone device remotely located from the scanner, the order information data being configured according to an HID, CDC or SPP protocol and corresponding to the item barcode;

receiving in an adapter application operating on the mobile phone device, the order information from the portable scanner;

parsing the order information data using the adapter application and transferring the order information data into a data field of an upload application operating on the mobile phone device;

transmitting, using the upload application, the order information data to a listener server;

whereas the listener server is configured to receive order information including the at least part of the order information data, from the upload application operating on the mobile phone device, receive and compile the order information data as at least one order batch whereas each order batch is a data structure containing scanned barcodes, convert the at least one order batch into an electronic supply order, store the at least one order batch in a data repository associated with the listener server, and send the electronic supply order to a vendor server;

and whereas the listener server is further configured to automatically create an electronic supply order for one or more batches containing scanned barcodes on the vendor server;

processing, using the listener server, the received order information into an electronic order; and transmitting the electronic order to a vendor server.

17. The method of claim 16, further comprising, using the listener server, cross referencing pricing information on the vendor server against pricing information on competitor vendor servers to determine a best price for the electronic order.

18. The method of claim 16, wherein the transferring comprises recognizing a special character in the order information data and, in response to the recognizing, shifting input from a current data field to a next data field.

19. The method of claim 16, further comprising scanning a quantity barcode using the portable scanner.

20. The method of claim 19, further comprising transmitting quantity data, configured according to an HID, CDC or SPP protocol, to the mobile phone device, the quantity data representing a quantity to be ordered for the supply item.

21. The method of claim 20, further comprising parsing the quantity data using the adapter application and transferring the quantity data into a quantity data field of the upload application.

22. The method of claim 21, further comprising cross referencing pricing information on the vendor server against pricing information on competitor vendor servers to determine a best price for the electronic order.

23. The method of claim 16, further comprising transmitting order information data from the portable scanner to a mobile phone device remotely located from the scanner in batch mode or in single item mode.

* * * * *